(12) United States Patent
Takahashi (10) Patent No.: US 9,472,176 B2
(45) Date of Patent: Oct. 18, 2016

(54) PERFORMANCE RECORDING SYSTEM, PERFORMANCE RECORDING METHOD, AND MUSICAL INSTRUMENT

(71) Applicant: YAMAHA CORPORATION, Hamamatsu-shi, Shizuoka (JP)

(72) Inventor: Yu Takahashi, Hamamatsu (JP)

(73) Assignee: YAMAHA CORPORATION, Hamamatsu-Shi (JP)

(*) Notice: Subject to any disclaimer, the term of this patent is extended or adjusted under 35 U.S.C. 154(b) by 0 days.

(21) Appl. No.: 14/892,765

(22) PCT Filed: May 19, 2014

(86) PCT No.: PCT/JP2014/063224
§ 371 (c)(1),
(2) Date: Nov. 20, 2015

(87) PCT Pub. No.: WO2014/189005
PCT Pub. Date: Nov. 27, 2014

(65) Prior Publication Data
US 2016/0125862 A1    May 5, 2016

(30) Foreign Application Priority Data
May 23, 2013  (JP) ................. 2013-109268

(51) Int. Cl.
*G10H 7/00* (2006.01)
*G10H 1/00* (2006.01)

(52) U.S. Cl.
CPC .......... *G10H 1/0033* (2013.01); *G10H 1/0008* (2013.01); *G10H 2220/455* (2013.01); *G10H 2230/015* (2013.01); *G10H 2240/005* (2013.01)

(58) Field of Classification Search
CPC ................ G10H 1/0033; G10H 2240/005; G10H 2230/015; G10H 1/0008
See application file for complete search history.

(56) References Cited

U.S. PATENT DOCUMENTS

| 8,962,967 B2 * | 2/2015 | Yoshikawa | G10H 1/0058 84/744 |
| 2003/0133700 A1 * | 7/2003 | Uehara | G10H 1/368 386/240 |
| 2007/0017349 A1 * | 1/2007 | Uehara | G10H 1/0008 84/609 |

(Continued)

FOREIGN PATENT DOCUMENTS

| JP | 2006319579 A | 11/2006 |
| JP | 2008078793 A | 4/2008 |

(Continued)

OTHER PUBLICATIONS

International Search Report issued in PCT/JP2014/063224, dated Aug. 26, 2014. English translation provided.

*Primary Examiner* — Jeffrey Donels
(74) *Attorney, Agent, or Firm* — Rossi, Kimms & McDowell LLP (57) ABSTRACT

A musical instrument includes: an operation section which is configured to accept a playing operation; a generation section which is configured to generate performance information representative of the accepted playing operation; a detection section which is configured to detect a portable terminal; and a control section which is configured to start, when the portable terminal is detected, processing of recording at least one of the performance information generated by the generation section and a video obtained by shooting a scene where the playing operation is performed, into at least one of the musical instrument and the portable terminal.

7 Claims, 10 Drawing Sheets

(56) References Cited

U.S. PATENT DOCUMENTS

| | | | |
|---|---|---|---|
| 2007/0017350 A1* | 1/2007 | Uehara | G10H 1/0058 84/609 |
| 2009/0178533 A1* | 7/2009 | Koseki | G10H 1/0066 84/171 |
| 2011/0061514 A1 | 3/2011 | Yokoyama et al. | |
| 2013/0031220 A1* | 1/2013 | Moncavage | G06Q 10/10 709/219 |
| 2014/0006945 A1* | 1/2014 | Herberger | G06F 3/0484 715/716 |

FOREIGN PATENT DOCUMENTS

| | | |
|---|---|---|
| JP | 2010008893 A | 1/2010 |
| JP | 2010054856 A | 3/2010 |
| JP | 201181364 A | 4/2011 |

\* cited by examiner

| USER ID | SERIAL NUMBER | DATE AND TIME INFORMATION | PERFORMANCE APPARATUS ID | MIDI DATA | VIDEO DATA |
|---|---|---|---|---|---|

| 002986 | 1 | 2013.5.16 | 100-001 | **.mid | **.avi |
|---|---|---|---|---|---|
| 002986 | 2 | 2013.5.16 | 100-001 | ****.mid | ****.avi |
| 002986 | 3 | 2013.5.14 | 100-002 | ****.mid | ****.avi |
| ... | 4 | ... | ... | ... | ... |

| 001527 | 1 | 2013.5.10 | 100-013 | PERFORMANCE DATA | VIDEO DATA |
|---|---|---|---|---|---|
| 001527 | 2 | 2013.5.8 | 100-015 | ****.mid | ****.avi |
| 001527 | 3 | 2013.5.2 | 100-002 | ****.mid | ****.avi |
| ... | 4 | ... | ... | ****.mid | ****.avi |

PERFORMANCE RECORDING SYSTEM, PERFORMANCE RECORDING METHOD, AND MUSICAL INSTRUMENT

TECHNICAL FIELD

The present invention relates to the recording of a performance.

BACKGROUND ART

An electronic musical instrument is available that has the function of storing as data the contents of a performance performed by a player and reproducing the contents of the performance later (see Patent Document 1).

PRIOR ART DOCUMENT

Patent Document

Patent Document 1: JP-A-2011-81364

SUMMARY OF THE INVENTION

Problem that the Invention is to Solve

Conventionally, to start the recording of a performance, it is necessary to perform a predetermined operation prior to the performance. The predetermined operation is, for example, when an electronic musical instrument having a performance recording function is used, an operation on a remote control terminal coming with the musical instrument or switches provided on the electronic musical instrument. Or it is an operation to connect the musical instrument and a sound recording device with each other and then, start sound recording on the sound recording device.

When there is no assistant for recording a performance, the player himself/herself needs to perform the above-mentioned operation. However, since the player is usually nervous before providing a performance, he/she tends to forget to perform such an operation and start the performance. Moreover, forcing such an operation before a performance sometimes makes some players feel psychologically burdened.

An object of the present invention is to start performance recording automatically.

Means for Solving the Problems

The present invention provides, in one mode, a musical instrument comprising: an operation section which is configured to accept a playing operation; a generation section which is configured to generate performance information representative of the accepted playing operation; a detection section which is configured to detect a portable terminal; and a control section which is configured to start, when the portable terminal is detected, processing of recording at least one of the performance information generated by the generation section and a video obtained by shooting a scene where the playing operation is performed, into at least one of the musical instrument and the portable terminal.

In a preferred mode, the control section is configured to stop the processing when the portable terminal becomes undetectable by the detection section.

In a preferred mode, when the portable terminal is detected, the control section is configured to start processing of recording at least one of the performance information generated by the generation section, sound information collected by a sound collection section and the video obtained by shooting the scene where the playing operation is performed, into at least one of the musical instrument and the portable terminal.

In a preferred mode, the musical instrument further comprises: an interface which is configured to perform communication with the detected portable terminal, and an instruction to start the shooting of the video by an image taking section is outputted to the detected portable terminal through the interface.

In a preferred mode, the musical instrument further comprises: a storage section; and an interface which is configured to perform communication with the detected portable terminal, and after a performance is ended, the performance information recorded in the storage section is outputted to the portable terminal.

The present invention provides, in another aspect, a performance recording method in a performance recording system including a musical instrument and a portable terminal, the performance recording method comprising: a step of accepting a playing operation in the musical instrument; a step of generating performance information representative of the playing operation accepted by the musical instrument; a step of the musical instrument detecting the portable terminal; and a step of starting, when the portable terminal is detected, processing of recording at least one of the generated performance information and a video obtained by shooting a scene where the playing operation is performed, in at least one of the musical instrument and the portable terminal.

The present invention provides, in still another aspect, a performance recording system including a musical instrument and a portable terminal, the performance recording system comprising: a storage unit; an acceptance unit accepting a playing performance; a generation unit generating performance information representative of the accepted playing operation; an image taking unit shooting a scene where the accepted playing operation is performed; a detection unit detecting that the portable terminal and the musical instrument are in a predetermined positional relationship; and a unit starting, when the portable terminal is detected, processing of recording at least one of the performance information generated by the generation unit and a video shot by the image taking unit, in the storage unit.

According to the present invention, performance recording is started automatically.

BRIEF DESCRIPTION OF THE DRAWINGS

FIG. 7 (a), FIG. 7 (b) and FIG. 7 (c) are views showing examples of the structure of data D2.

MODE FOR CARRYING OUT THE INVENTION

Figure 1:
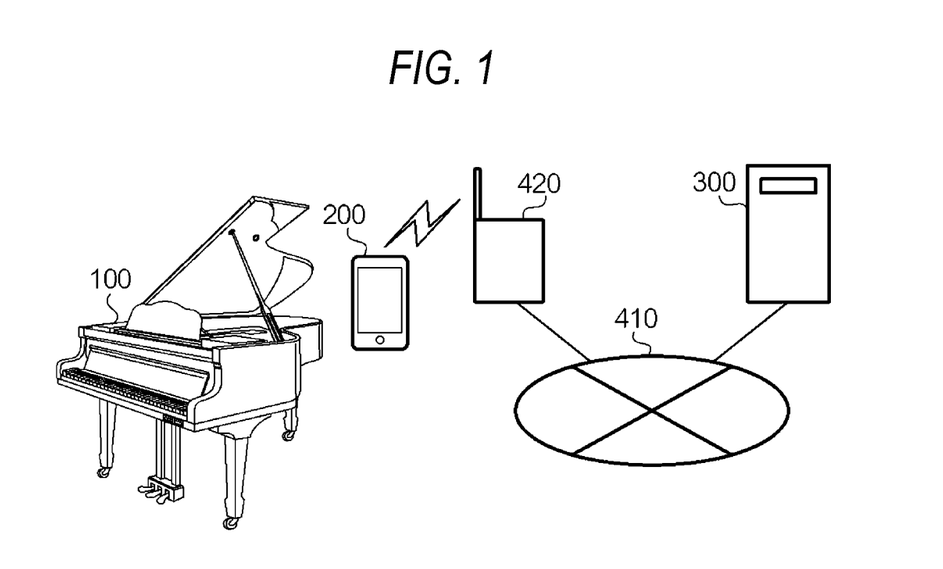
FIG. 1 is a conceptual view of a performance recording system 1.

FIG. 1 is a view schematically showing a performance recording system 1 according to an embodiment of the present invention. The performance recording system 1 includes a musical instrument 100, a portable terminal 200, a server 300, a communication network 410 and a relay device 420. The musical instrument 100 is a musical instrument played by the user. In the present embodiment, the musical instrument 100 is a keyboard instrument such as a piano or an electronic piano having at least the function of generating information on the performance performed by the player. While description will be given with the musical instrument as a common piano that emits sounds according to the playing operation in the following, the sound emission function is not essential in the musical instrument according to the present invention, and the musical instrument according to the present invention may be a musical instrument having no sound emission function such as Silent Piano (trademark). Moreover, the external form of the musical instrument is not limited to a keyboard instrument but may be a wind instrument, a percussion instrument or the like.

The portable terminal 200 is a portable information communication terminal such as a mobile telephone, a smartphone or a tablet PC. The portable terminal 200 has the function of exchanging information with the server 300 by performing communication by radio with the relay device 420 connected to the communication network 410, and has the function of exchanging information with the musical instrument 100. The server 300 has the function of storing data received from the portable terminal 200 through the relay device 420 and the communication network 410 and transmitting the stored data in response to a request from the portable terminal 200. The performance recording system 1 may include more than one musical instrument 100 and more than one portable terminal 200. In this case, one musical instrument 100 may be connected to more than one portable terminal 200, and one portable terminal 200 may be connected to more than one musical instrument 100. For convenience of explanation, only one musical instrument 100 and one portable terminal 200 are shown in FIG. 1.

In one mode of the present invention, the server 300, the communication network 410 and the relay device 420 may be omitted from the performance recording system 1. That is, in the performance recording system according to the present invention, it is unnecessary to provide the function of communication with the server 300. In this case, the data stored on the portable terminal 200 with respect to a performance is used (reproduced, edited, etc.) on the portable terminal 200.

Figure 2:
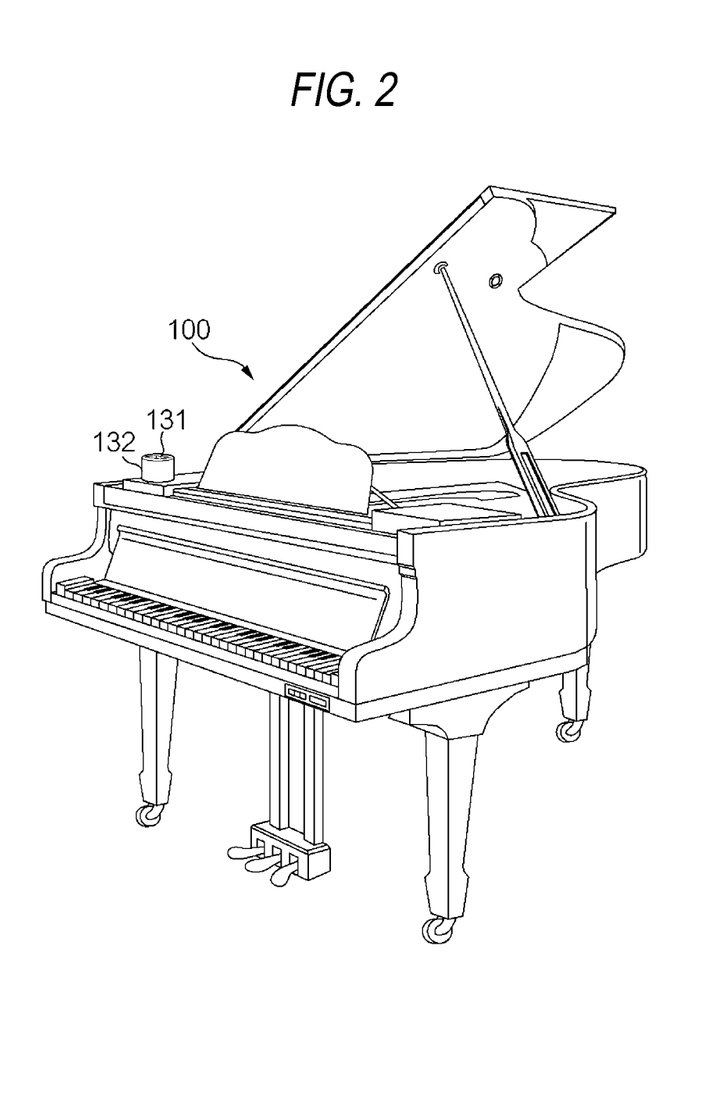
FIG. 2 is an external view of a musical instrument 100.

FIG. 2 shows the appearance of the musical instrument 100. The musical instrument 100 is provided with mechanisms the same as the mechanisms that common acoustic pianos have such as an action mechanism to beat strings according to the movement of keys of the keyboard and a damper that suppresses the vibration of strings according to the movement of a pedal. Moreover, when the musical instrument 100 is provided with an auto-play function, the musical instrument 100 is provided with sensors that detect the movement of keys (all are omitted in FIG. 1), a communication interface such as a connection terminal for capturing musical sound data from an external acoustic instrument or outputting performance information stored in the musical instrument 100 to an external device, and a user interface such as a touch panel for inputting setting contents or the like to confirm information or provide notification to the player.

The musical instrument 100 is provided with a mount 132 for placing the portable terminal 200. On the upper surface of the mount 132, a terminal 131 for connection with the portable terminal 200 is provided. When the user places the portable terminal 200 on the mount 132, the portable terminal 200 is fixed, and a condition is brought about where information can be exchanged between the musical instrument 100 and the portable terminal 200 through the terminal 131. The mount 132 may be made of a deformable material such as a flexible tube. In this case, the fixing position of the portable terminal 200 with respect to the musical instrument 100 can be changed according to the user's preference. In addition, not only the position but also the orientation of the portable terminal 200 can be adjusted. Moreover, the position where the mount 132 is provided is not limited to the position close to the left end of the music stand of the musical instrument 100 as shown in FIG. 2. However, it is preferably a position convenient for shooting the playing scene and situated within the reach of the user's hand to the extent that playing is not obstructed.

Figure 3:
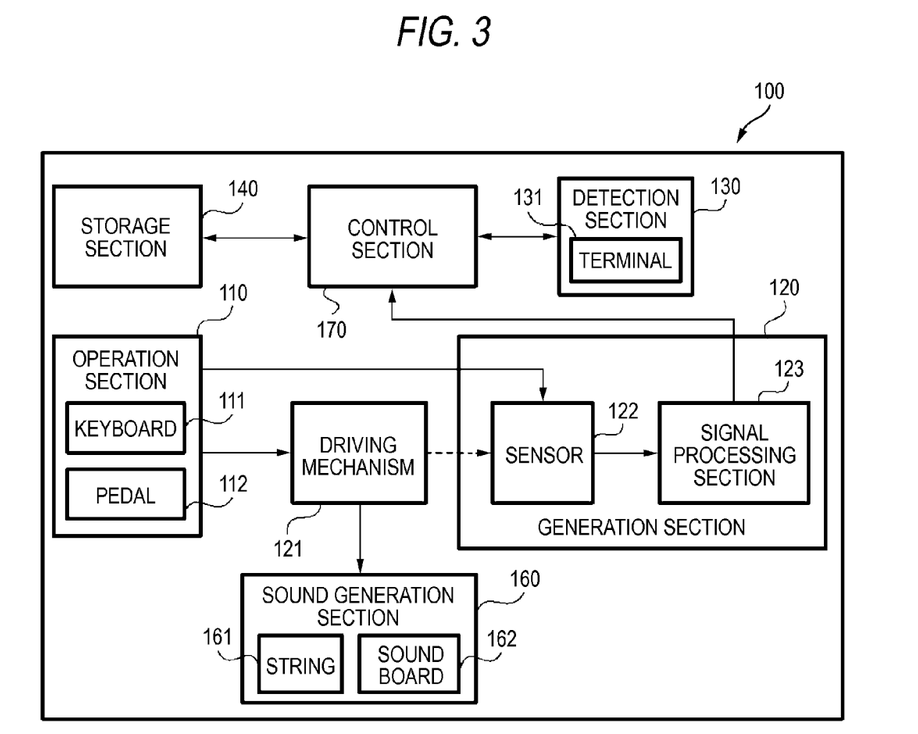
FIG. 3 is a structure diagram of the musical instrument 100.

FIG. 3 is a functional structure diagram of the musical instrument 100. The musical instrument 100 includes an operation section 110, a driving mechanism 121, a generation section 120, a detection section 130, a storage section 140, a sound generation section 160 and a control section 170. The operation section 110 is an input mechanism formed of a keyboard 111, a pedal 112 and the like, and accepts a playing operation by the player. The generation section 120 includes a sensor 122 and a signal processing section 123, and generates performance information representative of the playing operation accepted by the operation section 110. The driving mechanism 121 is an action mechanism to beat strings according to the movement of keys of the keyboard and a damper mechanism that stops the vibration of the strings, and transmits mechanical information reflecting the playing operation to the sound generation section 160. In addition, the musical instrument 100 is provided with a mechanism (not shown) such as an actuator that drives the musical instrument 100, and may have the function of implementing the automatic performance by operating the operation section 110 based on a control signal from the control section 170. That is, the musical instrument according to the present invention does not necessarily have the auto-play function.

The sensor 122 is provided for each key and hammer of the keyboard or for each string, detects at least either of the movement of the keyboard and the vibration of strings, and outputs the detected information to the signal processing section 123. The signal processing section 123 is implemented by a signal processor, and generates the performance information corresponding to the contents of the operation of the operation section 110 based on the information supplied from the sensor 122. The performance information has, for example, a MIDI (Musical Instrument Digital Interface) format. In this case, the performance information includes information representative of the timing of performance of the operation (note on/off), and the pitch (note number), the volume, the strength (velocity) and the like of the sound. In summary, the performance information is information where the player's playing operation (action) is reflected, and is only necessarily performance information based on which the contents of the performance can be reproduced. The generated performance information is outputted to the control section 170. Moreover, the signal processing section 123 performs signal processing such as processing, editing, data format changing and the like of the performance information.

The sound generation section 160 emits sounds corresponding to the playing operation accepted by the operation section 110. Specifically, the sound generation section 160 is formed of a string 161, a sound board 162 and the like, generates an acoustic wave based on a mechanical force of the operation section 110 transmitted through the driving mechanism 121, and conveys the generated acoustic wave to the space outside the musical instrument 100. The detection section 130 includes a terminal 131, the mount 132 (see FIG. 2) and a signal circuit (not shown), and functions as a cradle for placing the portable terminal 200. In addition, the detection section 130 detects the portable terminal 200. Specifically, mechanical contact between the terminal on the side of the portable terminal 200 and the terminal 131 is detected based on an electrical signal change. The detection result is outputted to the control section 170. Under the control of the control section 170, the detection section 130 outputs to the control section 170 the information supplied from the portable terminal 200 through the terminal 131, and also supplies to the side of the portable terminal 200 the information supplied from the control section 170. When the portable terminal 200 is detached from the detection section 130, the portable terminal 200 becomes undetectable by the detection section 130.

The storage section 140 is implemented by a semiconductor memory such as a RAM or a ROM, a magnetic storage medium such as a hard disk and an optical storage medium such as a DVD, and stores the performance information generated by the signal processing section 123 and the performance data obtained by editing the performance information. In addition, a terminal ID to identify the portable terminal 200 where information necessary for exchanging information with the portable terminal 200 is registered is stored. Further, an apparatus ID to identify the musical instrument 100 which apparatus ID is supplied to the portable terminal 200 and is information accompanying the performance is stored. Further, a program executed by the control section 170 and for controlling the musical instrument 100 is stored. This program may be prestored in the storage section 140 or may be stored later by being stored in a storage medium or downloaded from the communication network.

The control section 170 is implemented by a processor such as a CPU, and controls the operation section 110, the generation section 120 and the detection section 130 by using information obtained from the storage section 140 and the detection section 130, and the like. Specifically, when the portable terminal 200 is detected, the processing is started of recording at least any one of the performance information generated by the generation section and the video obtained by shooting the scene where the playing operation is being performed, into at least either of the musical instrument and the portable terminal. In a preferred mode, when the portable terminal 200 is detected, the control section 170 starts the processing of recording at least any one of the performance information generated by the generation section 120, the sound information collected by a sound collection section and the video obtained by shooting the scene where the playing operation is being performed, into at least either of the musical instrument and the portable terminal. In the present embodiment, for the video and the sound collection, the image taking function and the sound recording function provided to the portable terminal 200 are used.

This recording processing may be executed immediately after the portable terminal 200 is detected, or may be executed at a time depending on the readiness for video recording such as when a video recording start notification from the portable terminal 200 is received. In any case, it is unnecessary for the player of the musical instrument 100 to perform an operation to start performance recording except for placing the portable terminal 200 in a predetermined position.

In addition, the control section 170 determines the end timing of the performance recording. Specifically, when the portable terminal 200 becomes undetectable by the detection section 130, the recording processing is ended. Alternatively, when an instruction to stop recording is inputted from an input section 202 to the portable terminal 200 by the player or another person, the following may be performed: a signal to request the stop of the video recording is outputted from the portable terminal 200 to the musical instrument 100, and when receiving the signal, the musical instrument 100 ends the recording processing. Further, the control section 170 instructs the portable terminal 200 to start shooting at the portable terminal 200. In addition to the instruction to start image taking, an instruction to end image taking may be transmitted from the musical instrument 100 to the portable terminal 200.

When recording is performed by the musical instrument 100, every time a playing operation is detected, performance information reflecting the operation is stored in the storage section 140 by the minute. In a preferred mode, the performance information may be stored in the portable terminal 200 as performance data in the end. For example, the generated pieces of performance information are extracted from the storage section 140 by the minute or collectively at a predetermined time, and transferred to the portable terminal 200 through the detection section 130. The predetermined timing may be determined, for example, based on the speed of the transfer between the musical instrument 100 and the portable terminal 200. Alternatively, the performance information accumulated in the storage section 140 may be collectively outputted to the portable terminal 200 after the end of a string of performances (a performance of one piece of music).

Figure 4:
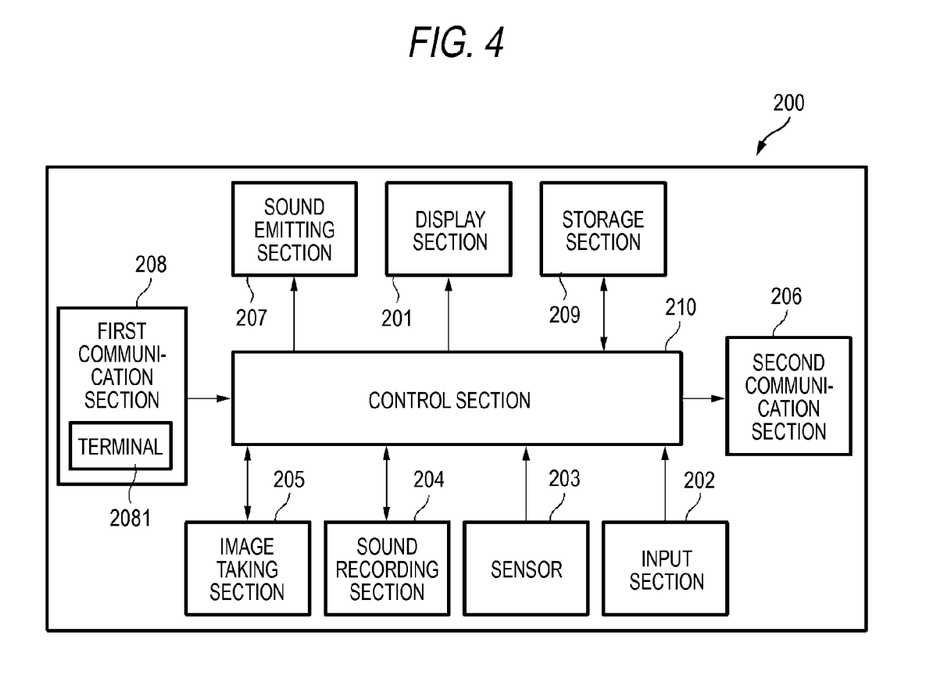
FIG. 4 is a functional structure diagram of a portable terminal 200.

FIG. 4 is a functional structure diagram of the portable terminal 200. The portable terminal 200 includes a display section 201, the input section 202, a sensor 203, a sound recording section 204, an image taking section 205, a second communication section 206, a sound emitting section 207, a first communication section 208, a storage section 209 and a control section 210. The display section 201 is a display device such as a liquid crystal display, and displays information necessary for the user at the time of the recording and image taking of the performance and the storage of information onto the server 300. The input section 202 is implemented by a numeric keypad or a touch panel, and accepts the information inputted by the user at the time of the recording and image taking of the performance and the storage of information onto the server 300. The sensor 203 includes sensors such as an acceleration sensor, a gyro sensor and an illuminance sensor and a processing circuit that analyzes the sensor result, and detects and determines the shooting environment.

The sound recording section 204 is formed of a microphone and a sound processing circuit, and performs sound collection. As the microphone, one provided on the sound recording section 204 may be used, or a microphone may be provided on the musical instrument 100 although not shown in FIG. 3. Alternatively, to the musical instrument 100, a microphone may be separately introduced into the performance recording system. 1 as a device independent of the portable terminal 200. The image taking section 205 is formed of a lens, an image sensor and a video signal processing circuit, and performs image taking. In the following, when "shooting" or "video recording" is cited, it will indicate that the obtaining of video data by the image taking section 205 and the sound collection by the sound recording section 204 are performed at the same time unless a specific explanation is provided. That is, when the object to be shot by the image taking section 205 is the player, the image of the player (and the image of the piano, the surrounding scenery, etc.) is obtained, and the playing sound by the musical instrument 100 (and when the player is singing simultaneously with playing, the singing sound and environmental sounds (other noises)) are collected.

The second communication section 206 is implemented by an antenna and a radio signal processing circuit, performs sound communication and data communication with the portable terminal 200 on the other end through the relay device 420 according to a radio communication standard such as 3G, LTE or IEEE, and establishes connection with the communication network 410 and the server 300 to perform data transmission and reception with the server 300. The sound emitting section 207 is a speaker, and informs the user of various pieces of information by sound as well as is used for the sound communication.

The first communication section 208 is provided with a terminal 2081 for connection with the detection section 130 of the musical instrument 100, and detects the connection with the musical instrument 100. Through the terminal 208, the terminal ID to identify the portable terminal 200 is provided to the musical instrument 100, and information such as the apparatus ID of the musical instrument 100 and musical sound data is provided from the musical instrument 100 to the portable terminal 200. The storage section 209 stores the user ID to identify the user, the terminal ID, the performance information and the performance information edited from the performance information received from the musical instrument 100 and the appendant information related to the performance (the apparatus ID, the date and time information, etc.). In addition, the storage section 209 stores a basic program and an application program executed by the control section 210 for controlling the control section 210. These programs may be stored in a storage medium or downloaded from a server device through the communication network.

The control section 210 is formed of a processor such as a CPU, and controls the display section 201, the input section 202, the sensor 203, the sound recording section 204, the image taking section 205, the second communication section 206, the sound emitting section 207, the first communication section 208 and the storage section 209. Specifically, at the control section 210, in addition to functions of common information communication terminals, the following functions are implemented by executing predetermined applications: the function of recognizing the connected musical instrument 100 through the terminal 2081; the function of outputting information to the musical instrument 100; the function of receiving a request from the musical instrument 100; and the function of controlling the image taking section 205, the sensor 203, the display section 201, the second communication section 206 and the like in response to the received request.

Figure 5:
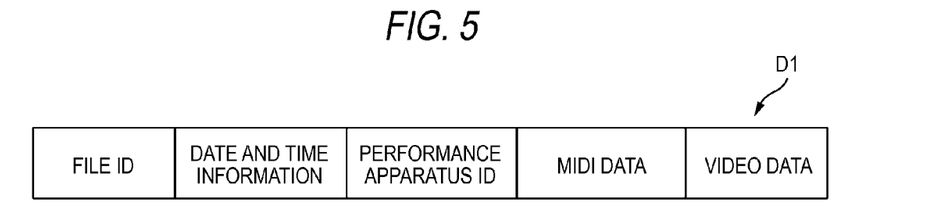
FIG. 5 is a view showing an example of the structure of data D1.

FIG. 5 is an example of the structure of data D1 stored in the storage section 209. D1 stores the file ID to identify each performance, the date and time when the performance was performed, the apparatus ID of the musical instrument with which the performance was performed and the performance information (MIDI data) in a state of being associated with one another. The control section 210 adds the user ID to the read information of D1 and transmits it to the server 300 automatically or when an instruction from the user arrives.

When the server 300 is omitted from the structure of the performance recording system 1, the storage section 209 is provided with the function of the server 300. In this case, it is unnecessary to access the server 300 by using the second communication section 206 in order to perform the reproduction and processing of the data related to the performance, and the like. In addition, since the recorded information is only information related to the user and it is unnecessary to distinguish between the others' information and the own information, there is no possibility that the data structure is complicated for the identification and authentication of the data creator.

Figure 6:
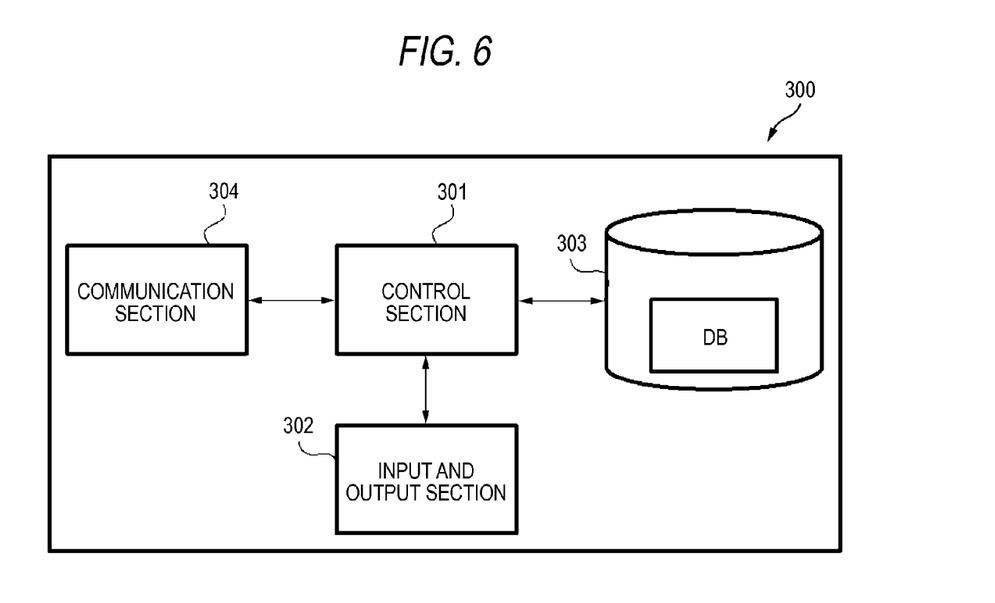
FIG. 6 is a functional structure diagram of a server 300.

FIG. 6 is a functional structure diagram of the server 300. The server 300 includes a control section 301, an input and output section 302, a storage section 303 and a communication section 304. The control section 301 is a processor such as a CPU, and controls the input and output section 302, the storage section 303 and the communication section 304. Specifically, in response to a request from the portable terminal 200, the performance data and the video data are received from the portable terminal 200 and stored in a database DB. Moreover, in response to a request from the portable terminal 200, the performance data recorded with respect to the performance performed by the user of the portable terminal 200 is provided, and a file specified by the portable terminal 200 is transmitted to the portable terminal 200. In this case, the server 300 may perform accounting processing. The communication section 304 is a communication interface, and performs data transfer with the portable terminal 200 through the communication network 410. In the data transfer, user authentication is performed based on the user ID without fail. The input and output section 302 is an input device and a display device such as a keyboard and a mouse. The storage section 303 is a storage device such as a hard disk, and stores the database DB where the performance data and the video recording data transmitted from the portable terminal 200 are stored in a state of being associated with each other.

Figure 7:
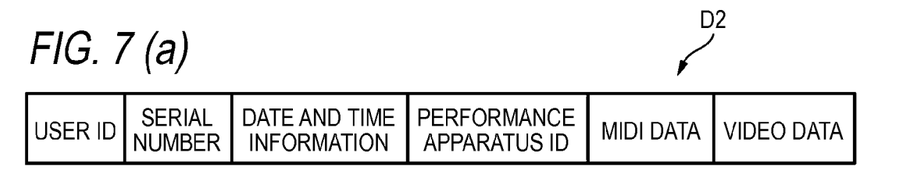

FIG. 7(a) shows an example of the structure of a data record D2 stored in the database DB. FIG. 7(b) and FIG. 7(c) show structure examples of databases DB1 and DB2 constructed for different users. In this way, a database particular to each user is constructed. In accessing the database DB, the control section 301 performs authentication processing using the user ID to thereby permit access only to a database corresponding to the user.

Figure 8:
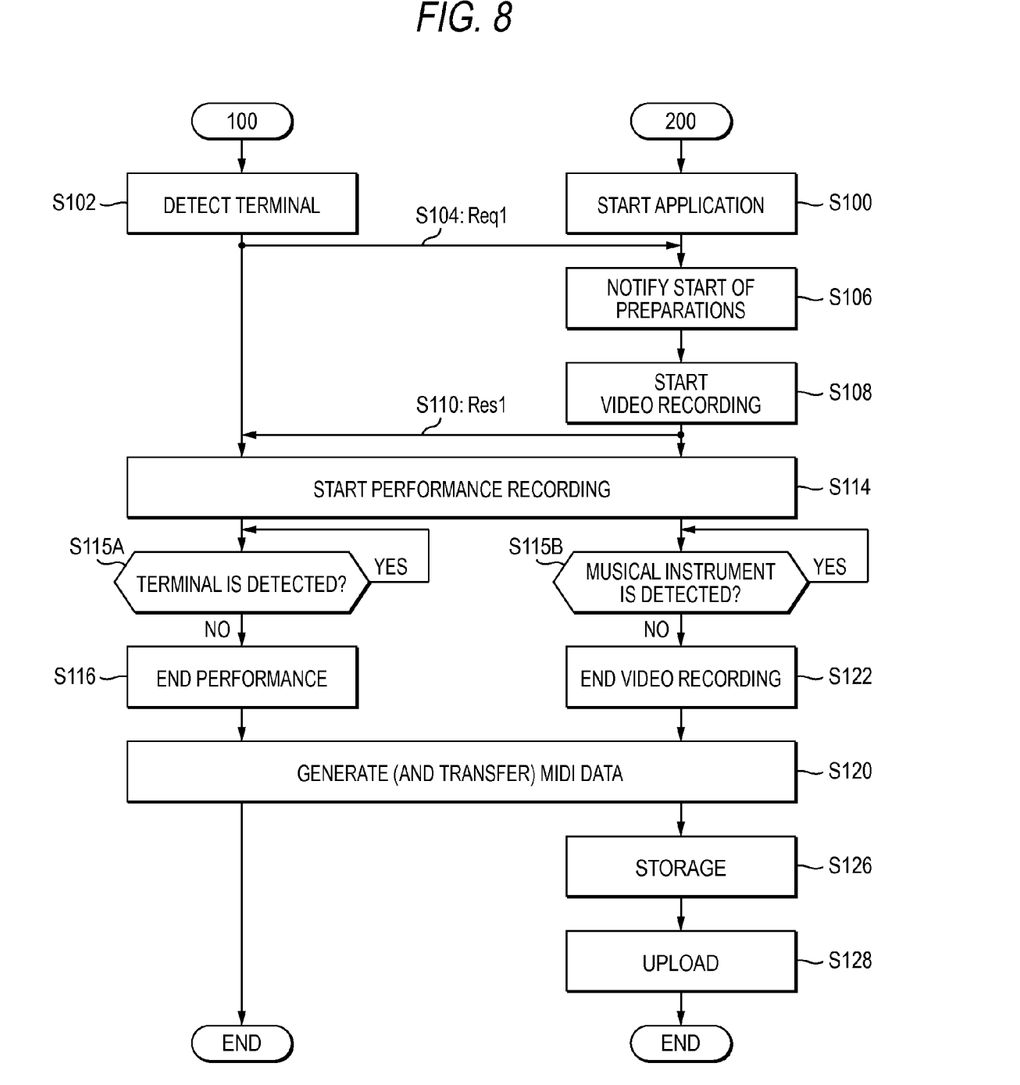
FIG. 8 is an example of the operation of the performance recording system 1.

FIG. 8 is an example of the operation of the performance recording system 1. First, the user carrying the portable terminal 200 performs advance preparations (S100). Specifically, an application to perform video recording in cooperation with the musical instrument 100 is started. Moreover, the apparatus ID of the portable terminal 200 is registered in the musical instrument 100. The user sits in front of the musical instrument 100, and places the portable terminal 200 on the detection section 130. Then, the musical instrument 100 detects the portable terminal 200 (S102). Specifically, the following processing is performed (not shown). At the same time, the portable terminal 200 also recognizes the connection with the musical instrument, and outputs the terminal ID to the musical instrument 100. When receiving the terminal ID from the portable terminal 200, the musical instrument 100 determines whether the ID has been registered in the storage section 140 or not. When the ID has not been registered, the processing is stopped. Alternatively, the processing for prompting new registration may be executed by outputting a signal to request new registration to the portable terminal 200 and displaying a predetermined registration guidance message on the screen of the portable terminal 200.

When confirming the fact of registration, the musical instrument 100 reads the apparatus ID of the musical instrument 100 from the storage section 140. The read apparatus ID is contained in a video recording request Req1 and transmitted to the portable terminal 200 (S104). The portable terminal 200 having received the video recording request Req1 displays a predetermined message on the screen, or makes an announcement by sound to thereby notify the player of the start of recording related to the performance (S106). Then, the portable terminal 200 actuates the image taking section 205 to start video recording (S108). The portable terminal 200 transmits a notification Res1 of the start of the video recording to the musical instrument 100 (S110). At this time, when the musical instrument 100 has the function of notifying the user of a message by video or sound, the user may be prompted to start a performance by being notified that the video recording has been started and preparations for performance recording has been completed by a blinking light emitting means in a predetermined pattern or the like. Thereafter, when a playing operation is detected by the sensor 122, the musical instrument 100 determines that a performance has been started, and records into the storage section 140 the performance information corresponding to all the playing operations detected thereafter while the portable terminal 200 continues being detected (S114). During this time, at the portable terminal 200, a message such that "Performance recording is underway. Do not detach the terminal." may be displayed to prompt the maintenance of connection of the terminal. The recorded performance information is stored in the storage section 140. Instead of recording in the storage section 140 or in addition to the storage section 140, the obtained performance information may be successively outputted to the portable terminal 200 and stored in the portable terminal 200.

The user stops or ends the performance, and detaches the portable terminal 200 from the detection section 130. Then, the musical instrument 100 recognizes that the portable terminal 200 becomes undetectable (S115A; NO), and the musical instrument 100 ends the recording of the performance (S116). On the other hand, when detecting that the connection with the musical instrument 100 is cut (S115B; NO), the portable terminal 200 ends the video recording (S122).

When pieces of performance information are successively transferred, the musical instrument 100 connects the pieces of performance information recorded from the start to the end of the performance, and generates one piece of MIDI data representative of a string of performances (S120). The generated MIDI data is transmitted to the portable terminal 200 together with the date and time information and the instrument ID (S120). When this is done, since the connection between the musical instrument 100 and the portable terminal 200 is cut, data transfer cannot be performed if this condition remains. Therefore, for example, when determining that the connection is cut before receiving the MIDI data, the portable terminal 200 again prompts the user to establish connection with the musical instrument 100 by displaying a predetermined message on the screen of the portable terminal 200 or the like. When connection is established again, transfer of the MIDI data is executed.

On the other hand, when the pieces of performance information have been successively transferred, the portable terminal may generate one piece of MIDI data by connecting the pieces of performance information received at that point of time without prompting reconnection (S120). That is, the generation of the MIDI data is performed not by the musical instrument 100 but by the portable terminal 200.

When receiving these pieces of data, the portable terminal 200 associates them with the data of the shot image and the sound, and stores them in the storage section 209 as performance data related to one performance (S126). Thereafter, when an instruction is provided from the user, the portable terminal 200 reads the performance data from the storage section 209, and uploads it to the server 300 as required together with the user ID and the shooting data (S128).

The determination to stop or end the performance may be made by the presence of an input of an instruction to end recording at the portable terminal 200 as well as by the user's act of detaching the portable terminal 200 from the detection section 130. Alternatively, when an input representative of the end of the performance is made in a case where the musical instrument 100 is provided with information input means or when no playing operation is detected for a predetermined period of time, the musical instrument 100 may determine that the performance is ended.

According to the present embodiment, performance recording is automatically started only by the user performing a simple act of placing in a predetermined position the portable terminal 200 where a predetermined application is executed. That is, since it is unnecessary to perform a switch operation for sound recording, the psychological burden on the player is light. In addition, video recording at the portable terminal 200 is automatically started without the player operating the portable terminal 200. Consequently, the player is freed from cumbersome advance preparations such as previously connecting the video recording device to the musical instrument 100.

The above-described embodiment may be modified as follows. The following modifications may be combined together.

Moreover, the detection of the portable terminal 200 by the musical instrument 100 may be performed in a non-contact manner. Hereinafter, an example where an electronic piano and a portable terminal perform radio communication will be described. It is to be noted that the electronic piano is an example of the instrument with which a performance is performed and may be an acoustic piano or another instrument.

Figure 9:
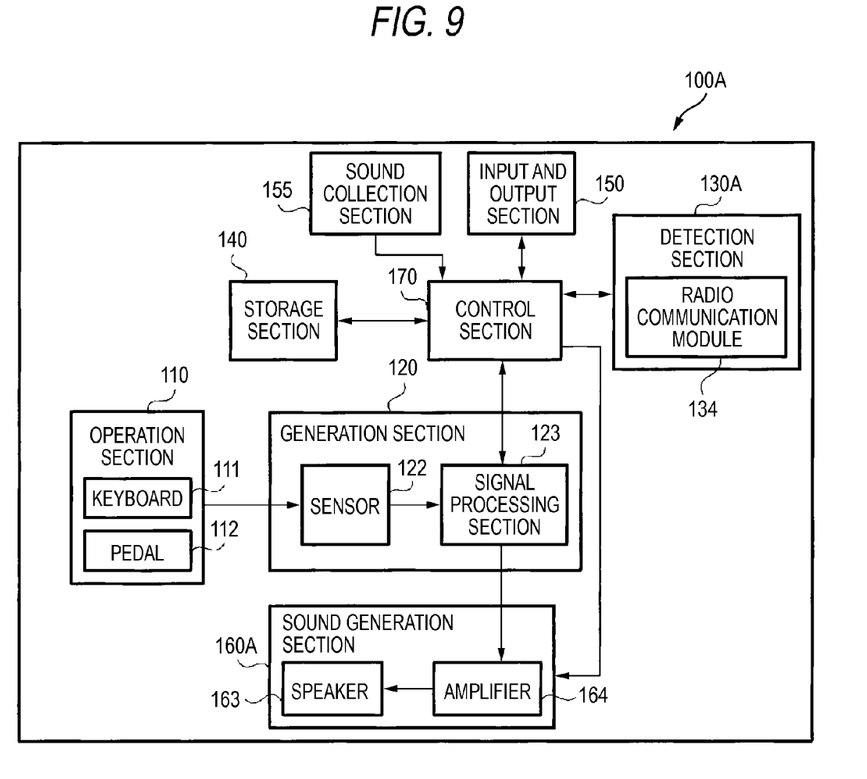
FIG. 9 is a structure diagram of a musical instrument 100A.

FIG. 9 shows the structure of a musical instrument 100A having functions of common electronic pianos. The functional structure of the musical instrument 100A is different from that of the musical instrument 100 in that the driving mechanism 121 is omitted while a detection section 130A and a sound generation section 160A are used instead of the sound generation section 160 and the detection section 130 and that an input and output section 150 and a sound collection section 155 are provided. The sound generation section 160A includes a speaker 163 and an amplifier 164. The speaker 163 performs sound emission based on the performance information. The amplifier 164 is a signal amplification circuit, amplifies the signal supplied from the signal processing section 123, and supplies it to the speaker 163. The keyboard 111, when detecting a key movement, outputs it to the sensor 122. The generation section 120 generates performance information. The generated performance information is supplied to the sound generation section 160A together with the control section 170. Thereby, the detection section 130A has a radio communication module 134 formed of an antenna and a signal processing circuit, and performs radio communication with the musical instrument 100A according to a communication standard such as Bluetooth (trademark) or WiFi (trademark). In a preferred mode, a near field radio communication standard such as FeriCa (trademark) or ISO/IEC14443 is used. The input and output section 150 is formed of display means formed of a liquid crystal screen and liquid crystal driving, a light emitting device, information output means such as a speaker and input means such as a button or a knob, and is used for the user to input setting information necessary for controlling the musical instrument 100A, notifying the control contents or prompting the user to perform an operation. The sound collection section 155 is formed of a microphone and a signal processing circuit, collects sounds (the sound of singing by the player and other environmental sounds) including the sound emitted by the musical instrument 100A, and performs acoustic signal processing such as analog/digital conversion to generate information representative of the collected sounds. In the following operation example, it is assumed that the musical instrument 100 grasps that the recording function is present in the portable terminal 200 when connected to the portable terminal 200 and determines not to use the function of the sound collection section 155 for the collection of the sounds including the playing sound.

The detection of the portable terminal 200 by the musical instrument 100A is performed by determining whether the musical instrument 100A and the portable terminal 200 are at a predetermined distance from each other. Specifically, when the strength of the radio signal received by the musical instrument 100A is not less than a predetermined one, it is determined that the musical instrument 100A is within a predetermined distance from the portable terminal 200. However, it is not always the case that shooting preparations are always completed when the portable terminal 200 is within a predetermined distance from the musical instrument 100A. For example, the portable terminal 200 may be put in a pocket, or the user (the person to give a performance) may be in a place far from the musical instrument 100A or may be moving about the musical instrument 100 so that the musical instrument 100A is not stationary. From this perspective, it is preferable for the portable terminal 200 to use the information from the sensor 203 or the information from the image obtained by the image taking section 205 in order to determine whether shooting preparations are completed or not (whether the position and posture of the musical instrument 100A are suitable for shooting or not) after recognizing the presence (approach) of the musical instrument 100A.

For example, the portable terminal 200 first determines the ambient brightness by the illuminance sensor of the sensor 203, and actuates the image taking section 205 when the illuminance is not less than a predetermined one. Then, the video taken by the image taking section 205 is analyzed to determine whether the object registrations such as the musical instrument 100A and the player are included in the video or not, whether the camera lens is in focus or not, and the like. In this determination, for example, the musical instrument 100A is previously shot, the video data thereof is registered in the storage section 209, and the obtained shooting data and the registered shooting data are compared with each other. Then, when determining that the objects to be shot are captured, the portable terminal 200 starts image recording. Alternatively, the following may be performed: The user of the musical instrument 100A with which a performance is to be started from now adjusts the position, orientation and the like of the portable terminal 200 by the minute while confirming the shot image, and inputs an instruction to start recording to the portable terminal 200 when the adjustment is completed.

Figure 10:
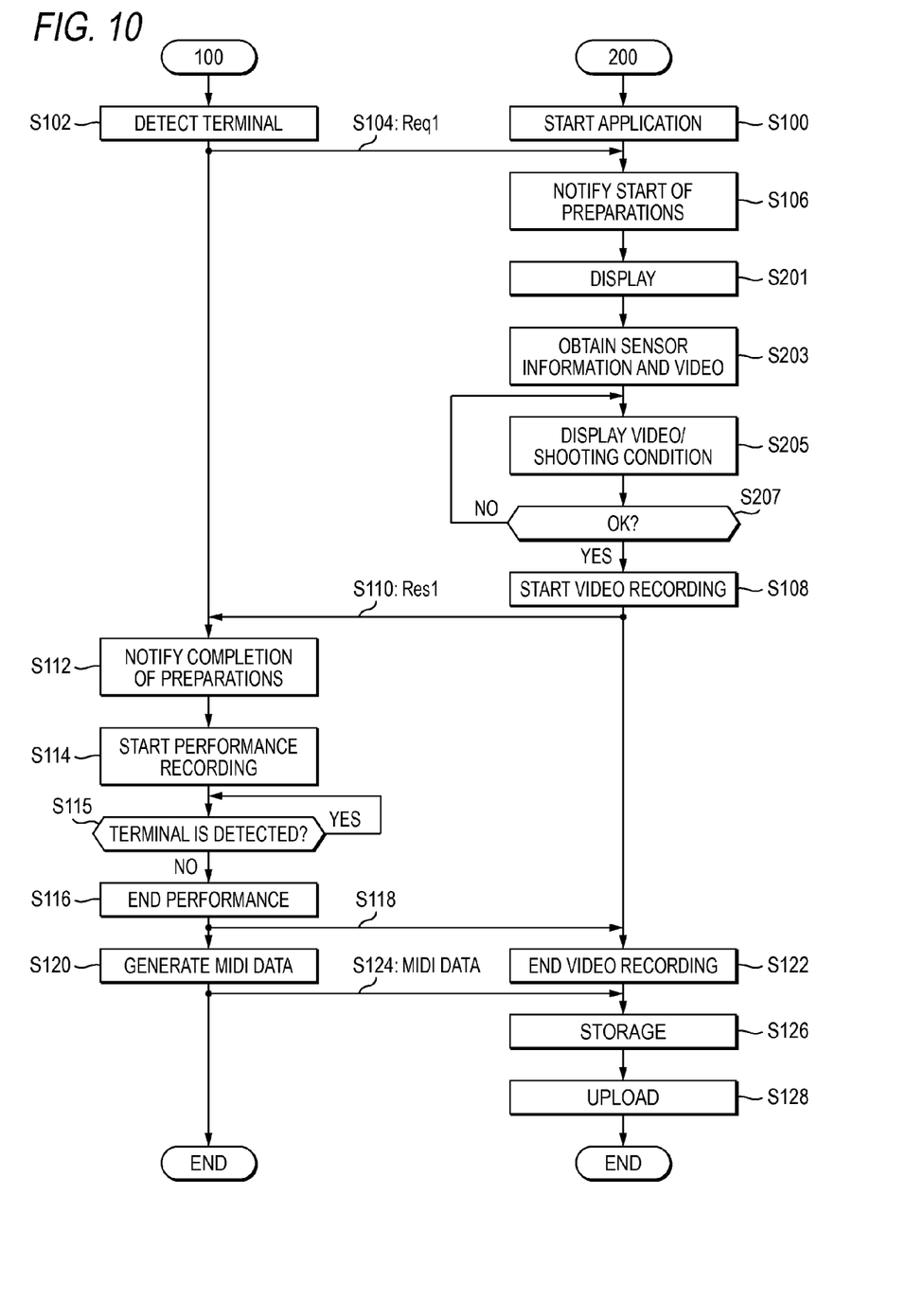
FIG. 10 is another example of the operation of the performance recording system 1.

FIG. 10 shows an operation example using the musical instrument 100A and the portable terminal 200 provided with the function (not shown) for performing radio communication with the musical instrument 100 according to a communication standard such as Bluetooth (trademark) or WiFi (trademark) in place of omitting the terminal. FIGS. 11(a) to 11(d) show examples of screens displayed on the portable terminal 200 in the operation example shown in FIG. 10.

Figure 11:
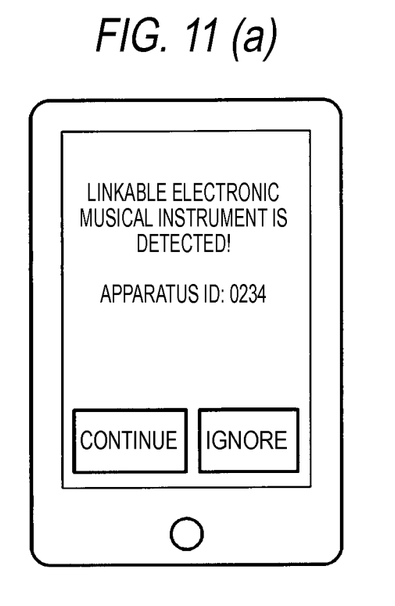
FIG. 11(a), FIG. 11(b), FIG. 11(c) and FIG. 11(d) are examples of images displayed on the screen of the portable terminal 200.

In FIG. 10, description of the processing from S100 to S106 is omitted since the processing is similar to the operation described by using FIG. 8 except that the detection process at S102 is performed in a non-contact manner. When receiving the video recording request Req1, the portable terminal 200 displays a message shown in FIG. 11 (a) on the screen to thereby provide a notification that communication has become possible between the portable terminal 200 and the musical instrument 100 and prompt the user to adjust the position and orientation of the portable terminal 200 to a condition suitable for shooting (S201).

The user hoping for video recording selects the software button "Continue" displayed on the screen, places the portable terminal 200 in the position where shooting is to be performed, and adjusts the orientation (posture) of the musical instrument 100A so that the image taking section is oriented toward the object to be shot. Further, detailed adjustments (setting of the zoom magnification and the focus) may be made. Then, the portable terminal 200 activates the image taking section 205, obtains shooting data, and successively obtains sensor information (the acceleration and the illuminance) by the sensor 203 (S203). Then, the portable terminal 200 determines whether shooting preparations have been completed or not by using at least either of the video data analysis result and the sensor information from the image taking section 205. This determination processing is repeated at predetermined intervals. When determining that shooting preparations have not been completed (for example, when nothing shows up, when the shown video is too dark, or when the portable terminal 200 is not stationary), the portable terminal 200 displays a screen as shown in FIG. 11(b), and prompts a change of the shooting environment. When determining that shooting preparations have been completed, the portable terminal 200 displays the video obtained by the image taking section 205, displays a message as shown in FIG. 11(c), and prompts the user to confirm shooting preparations (S205). As for the method of determining whether shooting preparations have been completed or not, for example, the musical instrument 100 is previously imaged by the portable terminal 200 and the images of the musical instrument 100 and surroundings of the musical instrument 100 are registered, calculates the similarity between the shot image data and the registered image data by using a known resolution algorithm, and the determination is made based on the degree of similarity.

When viewing the video and satisfying the current shooting environment, the user selects a software button "OK" (S207; YES). Then, the portable terminal 200 starts video recording in this shooting environment (S108), and provides a notification that video recording is underway as shown in FIG. 11(d) together with the video recording image. When a notification Rest is transmitted to the musical instrument 100 (S110), the user is notified that performance recording preparations have been completed by image or by sound by using the input and output section 150 (S112).

The processing of recording the performance is similar to the operation shown in FIG. 8. However, this example shows a case where the performance information is successively stored only at the musical instrument 100A and after the end of the performance, the portable terminal receives MIDI data from the musical instrument 100 (S120 and S124). Differences from the operation shown in FIG. 8 are that when it is determined that the performance has been ended at step S116, the musical instrument 100A transmits a video recording stop request to the portable terminal 200 (S118) and that when receiving the video recording stop request, the portable terminal 200 ends video recording (S122).

According to this modification, it is unnecessary that the apparatus necessary for starting performance recording and having the video recording function be brought into contact with the musical instrument. This significantly eases the restriction on the shooting position, so that the degree of freedom of video expression improves. Moreover, since video recording is always started after the user is made to confirm the shooting condition, recording can be prevented from being automatically started under a condition not suitable for shooting such that the server 300 remains in the user's pocket. Moreover, since if having the portable terminal 200, the player before performance is notified that preparations for performing recording of the playing sound and video recording of the player with the musical instrument 100 and the portable terminal 200 in cooperation with each other are completed, the risk of forgetting recording of the performance and video recording is reduced.

The performance information may be recorded in a format other than the format of MIDI data (also called MIDI message). For example, the following may be performed: The musical instrument 100 is provided with a microphone to collect the sounds emitted from the sound generation section 160 and the collected sounds are digitized and stored in at least either of the musical instrument 100 and the portable terminal 200 together with the MIDI data or instead of the MIDI data. Moreover, the data obtained by video recording only necessarily includes at least video data, or may include only video data or video data and sound data.

Moreover, while the information recorded with respect to the performance includes three kinds of data of (a) performance information and shooting data (specifically, (b) video data and (c) playing sound data [in some cases, the environmental sound and the singing sound are included]), a process to determine which data of (a) to (c) is recorded or whether all of them are stored may be introduced. For example, when the image taking function is absent in the portable terminal, only the playing sound data is recorded. Moreover, when the storage capacity and the signal processing speed are low, recording within the performance recording system may be inhibited with respect to a specific kind of data. This determination is performed, for example, when the musical instrument and the portable terminal are connected.

Moreover, the portable terminal 200 may automatically adjust the shooting environment. For example, a driving mechanism that makes the orientation of the camera variable is provided on the image taking section 205, and the control section 210 controls the driving mechanism so that an optimum shooting condition is realized. That is, the portable terminal used in the present invention only necessarily has at least the function of starting video recording when it is in a predetermined position with respect to the musical instrument, performing communication with the musical instrument 100 in a contact manner or in a non-contact manner and obtaining information representative of the contents of the performance performed with the musical instrument.

For the selection of whether the destination of recording of the performance information and the MIDI data is the musical instrument 100 (100A) or the portable terminal 200, the recording destination may be previously determined fixedly or determined every time the portable terminal 200 is detected. Moreover, when the recording destination is always set to the portable terminal 200, it is unnecessary to provide the musical instrument 100 with the storage section 140. In this case, the musical sound data is successively transferred to the portable terminal 200. As a concrete method of recording destination determination, for example, when the portable terminal 200 is detected, a predetermined negotiation is performed between the musical instrument 100 (100A) and the portable terminal 200. As an example, information representative of the degree of priority of the recording place is prestored in each of the musical instrument 100 (100A) and the portable terminal 200, and with reference to this information, the device where a higher degree of priority is set is determined as the recording destination.

Alternatively, the recording destination may be determined according to the musical instrument 100, the portable terminal 200 and the functional structure. For example, when the performance information generation function, the video recording function and the sound collection function are provided on both the musical instrument and the portable terminal, the performance information generation function, the video recording function and the sound collection function may be performed by the device where the functions are higher. Alternatively, the user may input information to specify the recording destination to the musical instrument 100 (100A) or the portable terminal 200. The musical instrument 100 (100A) and the portable terminal 200 may both perform video recording and sound collection at the same time (in parallel).

In summary, a performance recording system of the present invention at least has, in a performance recording system including a musical instrument and a portable terminal, a storage unit, an acceptance unit accepting a playing operation, a generation unit generating performance information representative of the accepted playing operation, an image taking unit shooting a scene where the accepted playing operation is being performed, a detection unit detecting that the portable terminal and the musical instrument are in a predetermined positional relationship, and a unit starting, when the portable terminal is detected, processing of recording at least any one of the performance information generated by the generation unit and a video shot by the image taking unit, in the storage unit.

And a musical instrument of the present invention only necessarily includes an operation section that accepts a playing operation, a generation section that generates performance information representative of the accepted playing operation, a detection section that detects a portable terminal, and a control section that starts, when the portable terminal is detected, processing of recording at least any one of the performance information generated by the generation section and a video obtained by shooting a scene where the playing operation is being performed, into at least either of the musical instrument and the portable terminal.

The present application is based upon Japanese Patent Application (No. 2013-109268) filed on May 23, 2013, the contents of which are incorporated herein by reference.

INDUSTRIAL APPLICABILITY

According to the present invention, performance recording can be started automatically.

DESCRIPTION OF REFERENCE NUMERALS AND SIGNS 100, 100A . . . musical instrument, 110 . . . operation section, 120 . . . generation section, 130 . . . detection section, 140 . . . storage section, 150 . . . input and output section, 155 . . . sound collection section, 160 . . . sound generation section, 170 . . . control section, 121 . . . driving mechanism, 122 . . . sensor, 123 . . . signal processing section, 111 . . . keyboard, 112 . . . pedal, 161 . . . string, 162 . . . sound board, 163 . . . speaker, 164 . . . amplifier, 300 . . . server, 301 . . . control section, 302 . . . input and output section, 303 . . . storage section, 304 . . . communication section, 200 . . . portable terminal, 201 . . . display section, 202 . . . input section, 203 . . . sensor, 204 . . . sound recording section, 205 . . . image taking section, 206 . . . second communication section, 207 . . . sound emitting section, 208 . . . first communication section, 209 . . . storage section, 210 . . . control section, 131 . . . terminal, 132 . . . mount, 2081 . . . terminal

The invention claimed is:

1. A musical instrument comprising:
an operation section configured to accept a playing operation;
a generation section configured to generate performance information representative of the accepted playing operation;
a detection section configured to detect a connection of a portable terminal to the detection section; and
a control section configured to start, in response to detection of the connection of the portable terminal to the detection section, processing of recording at least one of the performance information generated by the generation section and a video obtained by shooting a scene where the playing operation is performed, into at least one of the musical instrument and the portable terminal.

2. The musical instrument according to claim 1, wherein the control section is configured to stop the processing when the portable terminal becomes undetectable by the detection section.

3. The musical instrument according to claim 1, wherein, when the connection of the portable terminal is detected, the control section is configured to start processing of recording at least one of the performance information generated by the generation section, sound information collected by a sound collection section and the video obtained by shooting the scene where the playing operation is performed, into at least one of the musical instrument and the portable terminal.

4. The musical instrument according to claim 1, further comprising: an interface configured to perform communication with the detected portable terminal, wherein
an instruction to start the shooting of the video by an image taking section is outputted to the detected portable terminal through the interface.

5. The musical instrument according to claim 1, further comprising:
a storage section; and
an interface configured to perform communication with the detected portable terminal, wherein,
after a performance is ended, the performance information recorded in the storage section is outputted to the portable terminal.

6. A performance recording method in a performance recording system including a musical instrument and a portable terminal, the performance recording method comprising:
accepting a playing operation by the musical instrument;
generating performance information representative of the playing operation accepted by the musical instrument;
detecting a connection of the portable terminal to the musical instrument; and
starting, in response to detection of the connection of the portable terminal to the musical instrument, processing of recording at least one of the generated performance information and a video obtained by shooting a scene where the playing operation is performed, in at least one of the musical instrument and the portable terminal.

7. A performance recording system including a musical instrument and a portable terminal, the performance recording system comprising:
a storage unit;
an acceptance unit configured to accept a playing performance;
a generation unit configured to generate performance information representative of the accepted playing operation;
an image taking unit configured to shoot a scene where the accepted playing operation is performed;
a detection unit configured to detect that the portable terminal and the musical instrument are in a predetermined positional relationship; and
a control unit configured to start, in response to detection of the portable terminal and the musical instrument being in the predetermined positional relationship, processing of recording at least one of the performance information generated by the generation unit and a video shot by the image taking unit, in the storage unit.

* * * * *